United States Patent
Kuwahara et al.

(10) Patent No.: US 10,855,332 B2
(45) Date of Patent: Dec. 1, 2020

(54) SIGNAL TRANSMISSION SYSTEM

(71) Applicant: Mitsubishi Electric Corporation, Tokyo (JP)

(72) Inventors: Takashi Kuwahara, Tokyo (JP); Tetsu Owada, Tokyo (JP); Hiroshi Itakura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/755,251

(22) PCT Filed: Dec. 6, 2017

(86) PCT No.: PCT/JP2017/043834
§ 371 (c)(1),
(2) Date: Apr. 10, 2020

(87) PCT Pub. No.: WO2019/111354
PCT Pub. Date: Jun. 13, 2019

(65) Prior Publication Data
US 2020/0244307 A1    Jul. 30, 2020

(51) Int. Cl.
*H04B 3/04* (2006.01)
*H04L 25/03* (2006.01)
*H01P 5/08* (2006.01)

(52) U.S. Cl.
CPC ............ *H04B 3/04* (2013.01); *H04L 25/03* (2013.01); *H01P 5/08* (2013.01)

(58) Field of Classification Search
CPC ............. H04B 3/04; H04L 25/03; H01P 5/08
USPC ........................................................ 375/257
See application file for complete search history.

(56) References Cited

U.S. PATENT DOCUMENTS

| | | | |
|---|---|---|---|
| 5,537,041 A * | 7/1996 | Candy .................. | G01V 3/105 324/233 |
| 5,608,757 A | 3/1997 | Smith et al. | |
| 9,426,005 B1 * | 8/2016 | Galanopoulos ..... | H04L 25/4902 |
| 10,109,447 B1 * | 10/2018 | Hoff ....................... | H01J 23/15 |
| 2004/0136468 A1 * | 7/2004 | Suzuki .................. | H04L 27/12 375/295 |
| 2009/0149151 A1 * | 6/2009 | Bryant .................. | H03F 3/217 455/341 |
| 2010/0254481 A1 * | 10/2010 | Nakagawa .......... | H04B 5/0081 375/295 |

(Continued)

FOREIGN PATENT DOCUMENTS

JP    9-507978 A    8/1997

OTHER PUBLICATIONS

Itakura et al., "A Basic Study of Cable Transmission System with Non-contact Connector", IEICE, Mar. 22-25, 2017, Nagoya, p. 299.

*Primary Examiner* — Hirdepal Singh
(74) *Attorney, Agent, or Firm* — Birch, Stewart, Kolasch & Birch, LLP

(57) ABSTRACT

The transmission unit includes a digital signal source and a pulse generation circuit. The digital signal source generates a rectangular wave signal. The pulse generation circuit includes a short stub and an open stub, and generates a pulse signal corresponding to the rectangular wave signal. The receiving unit receives the pulse signal from the transmission unit via a lossy transmission path. A comparison circuit having a hysteresis function converts the received pulse signal into a rectangular wave signal.

5 Claims, 4 Drawing Sheets

(56) References Cited

U.S. PATENT DOCUMENTS

| | | | | |
|---|---|---|---|---|
| 2012/0126863 A1* | 5/2012 | Kamata | ............... | H04B 5/0081 |
| | | | | 327/142 |
| 2014/0376659 A1* | 12/2014 | Saito | ................... | H04B 1/0475 |
| | | | | 375/296 |
| 2015/0222461 A1* | 8/2015 | Motoi | ...................... | H03F 3/24 |
| | | | | 375/295 |
| 2020/0091608 A1* | 3/2020 | Alpman | .................. | H01Q 5/47 |

* cited by examiner

SIGNAL TRANSMISSION SYSTEM

TECHNICAL FIELD

The present invention relates to a signal transmission system using a lossy transmission path such as a metal wire, and in particular, improves its communication characteristics.

BACKGROUND ART

In signal transmission using lossy transmission paths such as cables and printed board wiring, transmission path loss in a high frequency region is prominent, so that characteristic deterioration such as decrease in the waveform amplitude at the receiving end or distortion of the received waveform is a problem. When such a problem occurs, when the receiving side determines 1/0 of the transmitted data (for example, the high level/low level of the voltage), it cannot be determined at the receiving end due to the effect of transmission path loss, or the reliability of signal transmission decreases due to occurrence of a determination error (bit error).

Since the skin effect and dielectric loss of the transmission path have a loss amount depending on the frequency of the transmission signal, waveform distortion and jitter (time axis error) increase at the receiving end, which causes communication quality deterioration. The skin effect is a phenomenon in which when a relatively high-frequency AC current flows through a conductor, the current density is high on the surface of the conductor and decreases from the surface toward the inside, and the influence of the skin effect increases as the frequency increases, which is a cause of conductor loss. The dielectric loss is a phenomenon in which electric energy is lost as thermal energy in a dielectric when an AC electric field is applied to the dielectric, and tends to increase in a high frequency region. Jitter associated with such frequency dependent loss depends on a bit string of a digital signal used for communication, and is therefore referred to as data dependent jitter (DDJ).

As a prior art used for suppressing such data dependent jitter, an equalizer disposed in a receiving unit and a pre-emphasis disposed in a transmission unit are known. An equalizer is one of signal conditioning (signal adjustment) techniques used in data transmission, and is a compensation circuit that in order to optimize the frequency characteristics of the transmission signal, adjusts the characteristics using a filter circuit or the like (for example, see Patent Literature 1). Pre-emphasis is also one of the signal conditioning techniques, and is a modulation circuit that amplifies the high-frequency region side of the transmission signal depending on the attenuation characteristics at the high frequency inherent to the transmission path and transmits the transmission signal from the transmission side, and thus improves the frequency characteristics of the signal received on the receiving side. In each of the conventional techniques, with respect to the frequency characteristic associated with the transmission path loss, waveform compensation processing of reverse characteristics (equivalent to a high-pass filter) is performed to obtain a flat frequency characteristic, thereby suppressing reduction in amplitude and jitter.

CITATION LIST

Patent Literature

Patent Literature 1: Japanese National Patent Publication No. 9-507978

SUMMARY OF INVENTION

Technical Problem

However, in a system using a conventional equalizer or pre-emphasis, an additional circuit for waveform compensation is required, and there is a problem that the circuit scale and cost increase. In addition, when accurate reverse characteristics cannot be obtained with respect to the frequency characteristics of the transmission path, there is a problem that the effect of suppressing data dependent jitter is low, and thus the communication performance is not improved.

The present invention has been made to solve such problems, and an object thereof is to provide a signal transmission system capable of suppressing data dependent jitter without strongly depending on the frequency characteristics associated with the transmission path loss.

Solution to Problem

The signal transmission system according to this invention includes a transmitter to transmit a signal, and a receiver to receive the signal from the transmitter via a lossy transmission path, in which the transmitter includes a signal source to generate a rectangular wave signal, and a pulse generation circuit including a short stub and an open stub each of whose propagation time corresponds to ¼ of a transition time of the rectangular wave signal, and to generate a pulse signal corresponding to the rectangular wave signal, and output the pulse signal to the lossy transmission path, and the receiver includes a comparator having a hysteresis function, and to convert the pulse signal received via the lossy transmission path into the rectangular wave signal.

Advantageous Effects of Invention

The signal transmission system according to this invention includes a pulse generation circuit including a short stub and an open stub each of whose propagation time corresponds to ¼ of a transition time of the rectangular wave signal, and for generating a pulse signal corresponding to the rectangular wave signal, and outputting the pulse signal to the lossy transmission path, and therefore the data dependent jitter can be suppressed without strongly depending on the frequency characteristic of the transmission path loss.

DESCRIPTION OF EMBODIMENTS

Hereinafter, in order to explain this invention in more detail, a mode for carrying out this invention will be described with reference to the accompanying drawings.

First Embodiment

Figure 1:
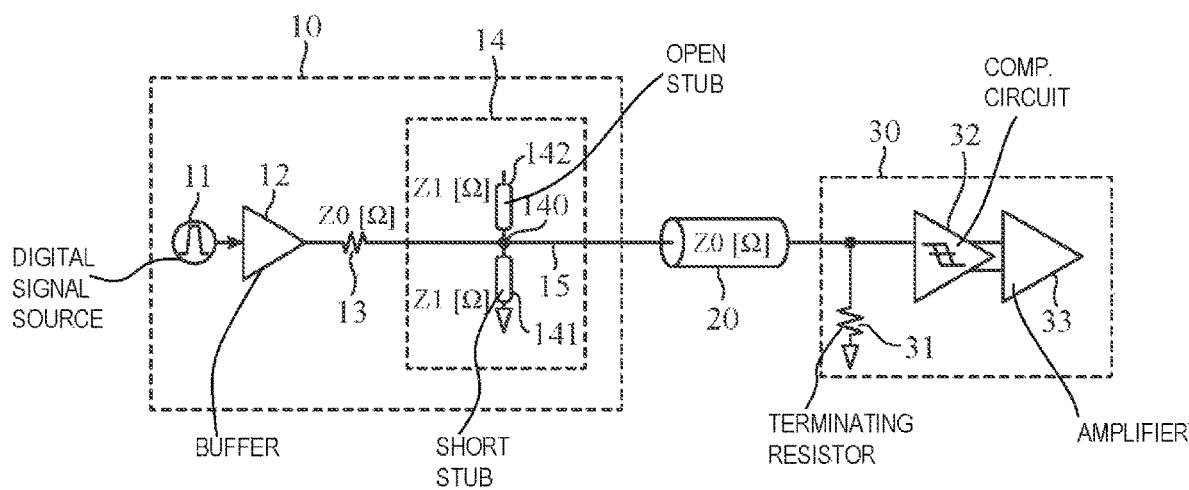
FIG. 1 is a configuration diagram of a signal transmission system according to a first embodiment of this invention.

FIG. 1 is a configuration diagram showing a signal transmission system according to the present embodiment.

The illustrated signal transmission system includes a transmission unit 10, a lossy transmission path 20, and a receiving unit 30. It is configured so that the transmission unit 10 transmits a digital signal, and the digital signal is received by the receiving unit 30 via the lossy transmission path 20. The transmission unit 10 includes a digital signal source 11, a buffer circuit 12, an output resistor 13, a pulse generation circuit 14, and a main line 15. The digital signal source 11 generates a rectangular wave signal corresponding to the digital signal. The buffer circuit 12 is a circuit for amplifying and buffering the rectangular wave signal from the digital signal source 11 as necessary. The output resistor 13 is a resistor on the output side of the buffer circuit 12, and corresponds to the resistance of the line on the input side of the pulse generation circuit 14. The pulse generation circuit 14 includes a short stub 141 and an open stub 142 and is connected to the main line 15 at a connection point 140. The short stub 141 and the open stub 142 are each configured so that a propagation time is ¼ of a transition time of the rectangular wave signal input to the pulse generation circuit 14, generate a pulse signal corresponding to the rectangular wave signal, and transmit the pulse signal to the lossy transmission path 20 via the main line 15. The main line 15 is a line extending from the output side of the buffer circuit 12 to the output side of the transmission unit 10 via the pulse generation circuit 14.

The lossy transmission path 20 is a transmission path made of a metal wire or the like and for performing data communication between the transmission unit 10 and the receiving unit 30. The receiving unit 30 includes a terminating resistor 31, a comparison circuit 32, and an amplifier 33. The terminating resistor 31 is a resistor that has one end connected between the lossy transmission path 20 and an input terminal of the comparison circuit 32 and the other end grounded, has the same value as the characteristic impedance of the lossy transmission path 20, and performs termination processing in the receiving unit 30. The comparison circuit 32 is a circuit that has a hysteresis function and generates a digital rectangular wave signal from the received pulse signal. The amplifier 33 is a circuit that amplifies the rectangular wave signal converted by the comparison circuit 32.

Next, the operation of the signal transmission system according to the first embodiment will be described.

Figure 2:
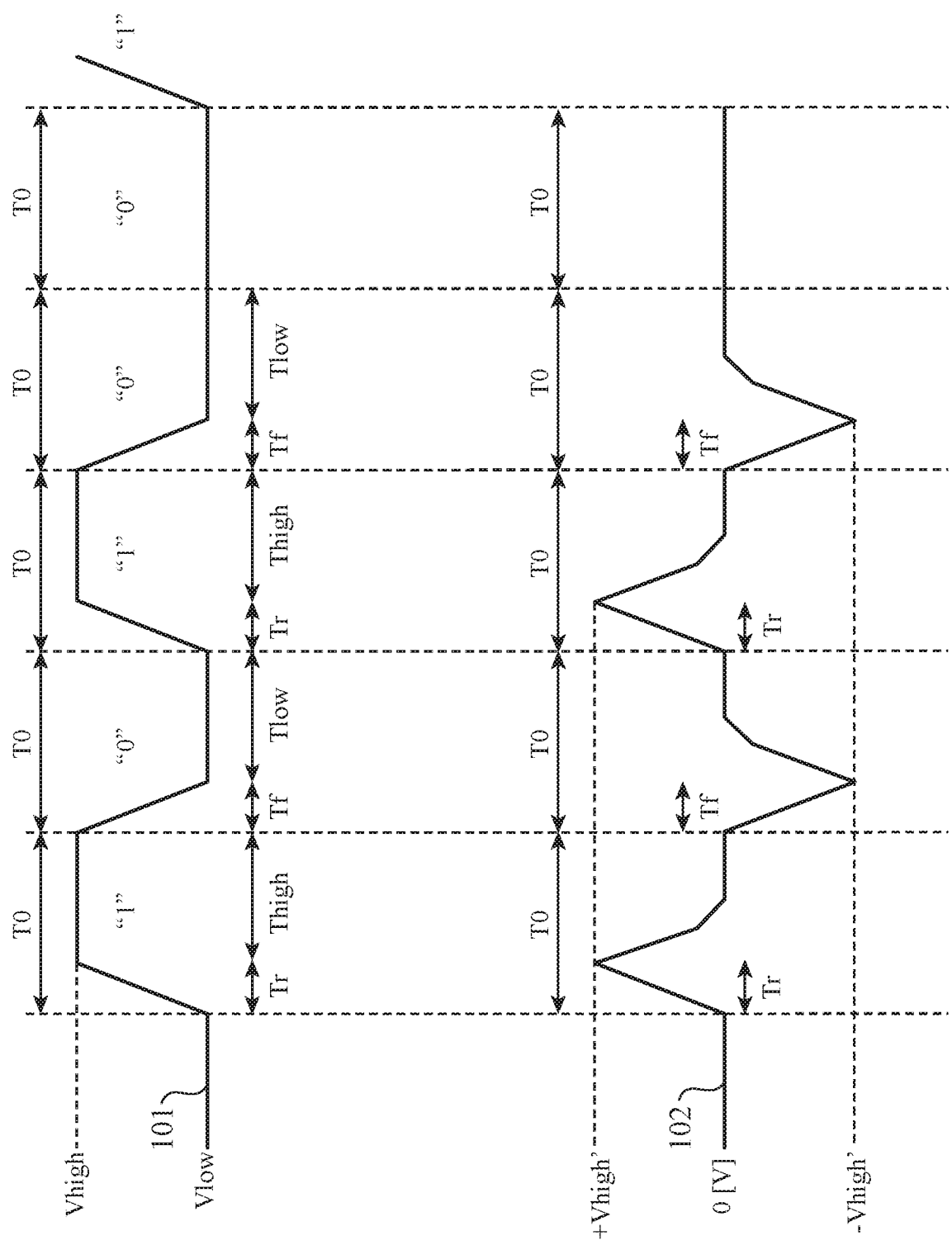
FIG. 2 is an explanatory diagram showing a rectangular wave signal and a pulse signal in the signal transmission system according to the first embodiment of this invention.

FIG. 2 is an explanatory diagram showing a rectangular wave signal output from the digital signal source 11 and input to the pulse generation circuit 14, and a pulse signal output from the pulse generation circuit 14.

The digital signal source 11 generates a rectangular wave signal corresponding to the digital signal, and the rectangular wave signal is input to the pulse generation circuit 14 via the buffer circuit 12. This is shown as an input signal 101 in FIG. 2. The input signal 101 shown in FIG. 2 is a rectangular wave signal corresponding to a digital value: 101001 . . . . The pulse generation circuit 14, with respect to the input rectangular wave signal, outputs a narrow pulse signal of a positive polarity when the rectangular wave signal rises, and outputs a narrow pulse signal of a negative polarity when the input rectangular wave signal falls. This is shown as a pulse signal 102 in FIG. 2. Thereafter, the pulse signal 102 is output from the main line 15 to the lossy transmission path 20.

The specific operation of the pulse generation circuit 14 will be further described.

Here, a case of the transition of the rectangular wave signal, that is, the rectangular wave signal rising from low to high is described. In the pulse generation circuit 14, the input signal 101 shown in FIG. 2 is branched at the connection point 140 between the short stub 141 and the open stub 142 and propagated in three directions to the main line 15, the short stub 141, and the open stub 142. At this time, since the wiring is branched into three, the signal voltage directed to the short stub 141, the open stub 142, and the main line 15 is lowered accordingly due to the principle of parallel resistance. The short stub 141 and the open stub 142 have the same length, and the propagation time is ¼ of the rise time (transition time) Tr of the rectangular wave signal. If the time at which the rectangular wave signal reaches the connection point 140 and the rectangular signal branches in the three directions is set to zero, the branched rectangular wave signals reach the ends of both stubs at time Tr/4. At this time, since at the end of the short stub 141, the stub is connected to the ground, assuming that the characteristic impedance of the short stub 141 is Z1 [Ω], a negative reflected (reverse phase reflection) wave having a reflection coefficient of Γ=(0−Z1)/(0+Z1)=−1 is generated. On the other hand, at the end of the open stub 142, assuming that the characteristic impedance of the open stub is Z1 [Ω] which is the same as that of the short stub, a positive reflected (in-phase reflection) wave having a reflection coefficient of Γ=(∞−Z1)/(∞+Z1)≈+1 is generated.

At time Tr/4*2, the reflected waves from both stubs return to the connection point 140. At this time, reflection due to impedance mismatching and transmission occur at the connection point 140, because the main line 15 and the two stubs are provided. However, since the positive reflected wave from the open stub 142 and the negative reflected wave from the short stub 141 arrive at the connection point 140 at the same time, the reflections from the ends of both stubs are canceled each other, so that the voltage of the connection point 140 continues the way of rising from time 0 to Tr/2.

After time Tr/2, the reflected waves first generated at the ends of both stubs pass through the connection point 140 and are propagated to the opposite stubs, and reach the ends of the opposite stubs at time Tr/4*3. At this time, the signal first reflected at the end of the open stub 142 passes through the connection point 140 and reaches the end of the short stub 141, while the signal first reflected at the end of the short stub 141 passes through the connection point 140 and reaches the end of the open stub 142.

At time Tr/4*4, that is, at time Tr when the rectangular wave from the digital signal source 11 has risen completely, the signal propagated through the path from the end of the open stub 142 to the end of the short stub 141 and the signal propagated through the path from the end of the short stub 141 to the end of the open stub 142 return to the connection point 140 for the second time, each of the signals propagated through the two paths is affected by negative reflection and positive reflection, and thus the output signal from the pulse generation circuit 14 starts to fall from this time. That is, the narrow pulse signal output from the pulse generation circuit 14 has a voltage peak at time Tr, and the rise time of the narrow pulse signal output from the pulse generation circuit 14 is also the same Tr. At this time, the slope of the voltage drop at the time of falling is opposite in sign to the slope of the voltage rise at the time of rising, but the absolute amount of the angle (voltage change amount/time) is the same.

When the characteristic impedance of each of both stubs is not equal to a value of the output resistor 13 and not equal to the characteristic impedance of the lossy transmission path 20, since at time 2Tr, reflection due to impedance mismatching and transmission occur again at the connection point 140, the narrow pulse signal output from the pulse generation circuit 14 at time 2Tr does not converge to 0V, but gradually converges to 0V by repetitive round trips to the ends of both stubs. The case where the characteristic impedance of each of both stubs is the same as a value of the output resistor 13 and as the characteristic impedance of the lossy transmission path 20 will be described later in the second embodiment.

Further, the principle is the same also when the rectangular wave signal falls, and the difference from the above-described rise is that the output of the pulse generation circuit 14 is negative polarity (negative voltage peak). Normally, the transition time of the rectangular wave signal, that is, the relationship between the rise time Tr and the fall time Tf is Tr=Tf. Thereafter, the output voltage of the pulse generation circuit 14 is 0V until the rectangular wave signal makes the next transition.

The pulse generation circuit 14 of the present embodiment using the short stub 141 and the open stub 142 is different from the filter design method considering the frequency domain by a band pass filter (BPF) or a band stop filter (BSF) using a ¼λ (λ is a wavelength corresponding to the basic frequency f0=a half frequency of transmission rate) stub. Since the design parameter in the present embodiment depends on the transition time of the rectangular wave signal, it does not depend on the speed of the transmission rate. That is, λ is not a design parameter. No matter how the transmission rate of the rectangular wave signal is low (no matter if f0 is low or λ is long), when the transition time (rise/fall time) of the rectangular wave signal is short compared to the transmission rate, the lengths of the short stub 141 and the open stub 142 used in the present embodiment are also short accordingly.

In addition, since the present embodiment is not related to a filter intended for use in the field of microwave and is not related to a differentiating circuit in which capacitors are connected in series, the output signal of the pulse generation circuit 14 does not have a differential waveform. That is, the R element and C element required for the differentiating circuit are unnecessary. If the voltage transition in the rise/fall time of the rectangular wave signal is linear, the voltage transition from Low to High and High to Low in the output waveform of the pulse generation circuit 14 is also linear.

Next, the operation of the receiving unit 30 in the signal transmission system will be described. The receiving unit 30 receives the narrow pulse signal output from the transmission unit 10, and forms a rectangular digital signal by the comparison circuit 32 to which hysteresis is added. A comparison circuit is a circuit that compares two input voltages (or currents) and switches the output depending on the comparison result. Adding hysteresis is, for example, setting thresholds on the high and low sides with respect to voltage. That is, when the input signal exceeds the threshold on the high side, the voltage set as high determination is output, and when the input signal falls below the threshold on the low side, the voltage set as low determination is output. This function is commonly used for digital waveform shaping. Note that, since the terminating resistor 31 having the same value as the characteristic impedance of the lossy transmission path 20 is connected to the receiving unit 30, no signal reflection occurs at the receiving end.

Figure 3A:
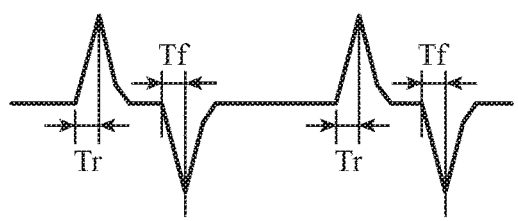
FIG. 3A is an explanatory diagram showing an output waveform of a transmission unit in the signal transmission system according to the first embodiment of this invention.
Figure 3B:
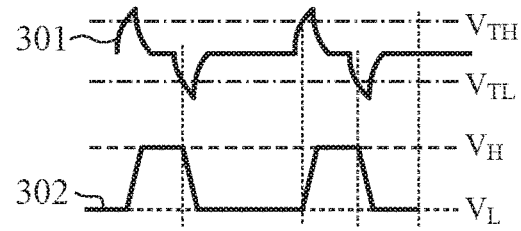
FIG. 3B is an explanatory diagram showing an input signal and a waveform reproduced signal of a receiving unit.

FIG. 3A is an explanatory diagram showing an output waveform from the transmission unit 10, and FIG. 3B is an explanatory diagram showing an input signal and an output signal of the comparison circuit 32 in the receiving unit 30.

When the narrow pulse signal shown in FIG. 3A is output from the transmission unit 10, the comparison circuit 32 in the receiving unit 30 receives the narrow pulse signal 301 transmitted through the lossy transmission path 20, and continues to output $V_H$ if the voltage level of the signal exceeds the preset high-side voltage threshold $V_{TH}$, and outputs $V_L$ if the voltage level falls below the low-side voltage threshold $V_{TL}$ (see the output signal 302).

That is, since the narrow pulse signal output from the pulse generation circuit 14 is a positive polarity pulse or a negative polarity pulse, when the voltage of the positive polarity pulse exceeds the high-side voltage threshold of the comparison circuit 32 or the voltage of the negative polarity pulse falls below the low-side voltage threshold, the receiving unit 30 recognizes reception of the pulse signal.

As a result, a rectangular digital signal that reproduces the transmission rate of the original signal in the transmission unit 10 is output from the comparison circuit 32 of the receiving unit 30.

By using the configuration as described above, the following effects are obtained in the first embodiment. That is, the conventional transmission system has a problem that since a rectangular digital signal is transmitted, it is easily affected by adjacent bits when connected to a lossy transmission path such as a cable transmission system, and the frequency band becomes wider as the transmission rate increases, and the upper limit of the use frequency becomes also higher accordingly, so that jitter increases. In contrast, in the present embodiment, since the transmission unit 10 includes the pulse generation circuit 14, and the transmission waveform output to the lossy transmission path 20 is a narrow pulse signal, even though the transmission loss due to the lossy transmission path 20 has frequency characteristics, it is not affected by adjacent bits. This is because a time interval is formed between adjacent narrow pulse signals. As a result, the two stub structures provide narrow pulse signal generation that does not cause waveform distortion at the receiving end and can suppress deterioration by jitter depending on the data arrangement.

Further, the narrow pulse signal output from the pulse generation circuit 14 does not depend on the transmission rate of the rectangular wave signal, but only depends on the transition time (Tr or Tf) of the rectangular wave signal.

Furthermore, since the pulse generation circuit 14 has a structure having a short stub 141 and an open stub 142 therein, a component such as a delay element or a sign inverting element is not used. Therefore, problems such as an increase in circuit scale and cost, and variations in characteristics for each element can be solved.

Further, in the pulse generation circuit 14, the signal output from the buffer circuit 12 is connected to the ground by the short stub 141, so that it is short-circuited to ground in terms of direct current (DC) or lumped constant. For this reason, there is no DC offset in the signal transmission path, so that there is an effect that it is not necessary to provide a DC cut capacitor in series at the entrance of the receiving unit 30.

As described above, according to the signal transmission system of the first embodiment, it includes a transmission unit for transmitting a signal and a receiving unit for receiving the signal from the transmission unit via a lossy transmission path. The transmission unit includes a signal source that generates a rectangular wave signal, and a pulse generation circuit that includes a short stub and an open stub each of whose propagation time corresponds to ¼ of a transition time of the rectangular wave signal, generates a pulse signal corresponding to the rectangular wave signal, and outputs the pulse signal to the lossy transmission path. The receiving unit includes a comparator that has a hysteresis function and converts the pulse signal received via the lossy transmission path into a rectangular wave signal. Therefore, data dependent jitter can be suppressed without strongly depending on the frequency characteristics of transmission path loss.

Second Embodiment

In the second embodiment, the characteristic impedance of each of the short stub and the open stub is set to the same value as the resistance value of the output resistance and as the characteristic impedance of the lossy transmission path.

Figure 4:
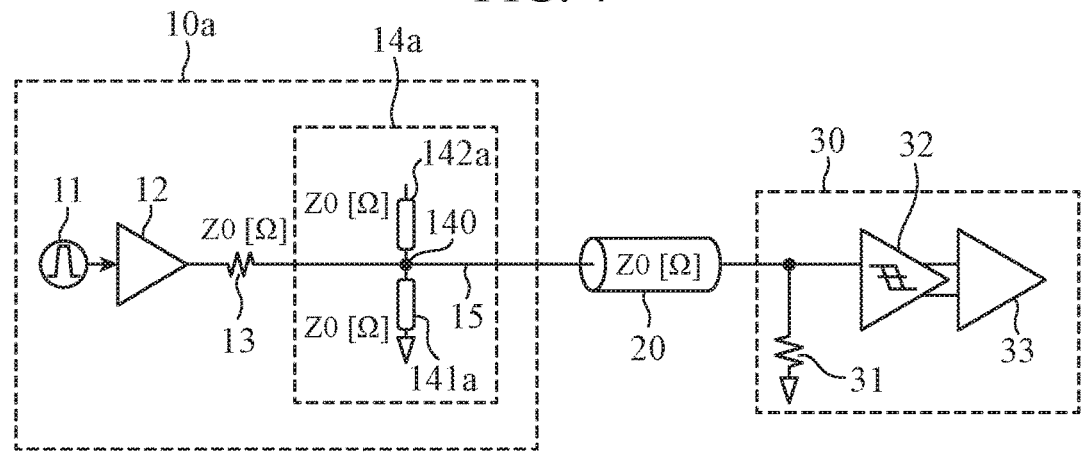
FIG. 4 is a configuration diagram showing a signal transmission system according to a second embodiment of this invention.

FIG. 4 is a configuration diagram of a signal transmission system according to the second embodiment.

In the illustrated signal transmission system, a transmission unit 10a and a receiving unit 30 are connected via a lossy transmission path 20. The transmission unit 10a of the second embodiment is configured so that the characteristic impedance of each of a short stub 141a and an open stub 142a included in a pulse generation circuit 14a is equal to the resistance value (Z0) of the output resistor 13 and equal to the characteristic impedance (Z0) of the lossy transmission path 20. Since the other configuration is the same as that of the first embodiment shown in FIG. 1, the corresponding parts are denoted with the same reference numerals, and the description thereof is omitted.

Next, the operation of the pulse generation circuit 14a in the second embodiment will be described.

In the pulse generation circuit 14a of the second embodiment, at the time when the reflected waves generated at the ends of the short stub 141a and the open stub 142a each return to the connection point 140 (time Tr/2), reflection occurs due to impedance mismatching caused by branching in three directions of the output resistor 13 direction, the lossy transmission path 20 direction, and the opposite stub direction. That is, reflection with a reflection coefficient of Γ=(Z0/3−Z0)/(Z0/3+Z0)=−0.5 occurs. At that time, half is a reflection component returning to the end of the stub that has been propagated so far, and the other half is transmitted in the three directions. Here, the difference from the first embodiment is that the reflection coefficient Γ at the connection point 140 is −0.5, and since the amount transmitted and the amount returned by the reflection are the same, negative reflection caused by the end of the short stub 141a and positive reflection caused by the end of the open stub 142a are the same and are just canceled each other at the connection point 140, and the voltage at the connection point 140 continues the way of rising from time 0 to Tr/2 as it is until the time Tr.

After time Tr/2, the reflected waves first generated at the ends of both stubs pass through the connection point 140 and are propagated to the opposite stubs, and reach the ends of the opposite stubs at time Tr/4*3. At this time, the signal first reflected at the end of the open stub 142a passes through the connection point 140 and reaches the end of the short stub 141a, while the signal first reflected at the end of the short stub 141a passes through the connection point 140 and reaches the end of the open stub 142a.

At time Tr/4*4, that is, at time Tr when the rectangular wave signal from the digital signal source 11 has risen completely, the signal having been propagated through the path from the end of the open stub 142a via the connection point 140 point to the end of the short stub 141a and the signal having been propagated through the path from the end of the short stub 141a via the connection point 140 point to the end of the open stub 142a return to the connection point 140 for the second time. Since each of the signals having been propagated through the two paths is influenced by the negative reflection and the positive reflection, the output signal from the pulse generation circuit 14a starts to fall from this time by taking the time Tr. That is, the narrow pulse signal output from the pulse generation circuit 14a has a voltage peak at time Tr, and the rise time of the narrow pulse signal output from the pulse generation circuit 14a is also the same Tr.

Here, in the second embodiment, since the characteristic impedance of each of both stubs=the resistance value of the output resistor 13=the characteristic impedance of the lossy transmission path 20, as described above, the reflection coefficient Γ=−0.5, and the fall of the narrow pulse signal is 0V in Tr. Therefore, a time in which the narrow pulse is output from the pulse generation circuit 14a is characterized by rise time Tr+fall time Tr=2Tr. At this time, in the narrow pulse signal output from the pulse generation circuit 14, when the slope of the input signal to the pulse generation circuit 14a at the time of rising/falling is linear, the slope of the output signal of the pulse generation circuit 14a at the time of rising/falling is also linear, and the narrow pulse signal has a waveform that is line symmetric with respect to the peak voltage time like an isosceles triangle. Note that the principle is the same also when the rectangular wave signal falls, and the difference from the above rising is that the output of the pulse generation circuit 14a is negative polarity (negative voltage peak).

Thus, in the second embodiment, the time width of the narrow pulse signal output from the pulse generation circuit 14a is only two times the transition time (Tr or Tf) of the rectangular wave signal regardless of the transmission rate of the rectangular wave signal. After that, the output becomes 0V until the next transition in the input signal. This creates a time interval in the pulse signal. Since with respect to Tr or Tf of the rectangular wave signal, the transition time to the peak value of the narrow pulse signal output from the pulse generation circuit 14a is also Tr or Tf the frequency component of this narrow pulse signal does not become higher than that of the rectangular wave signal. That is, there is an effect that it is not necessary to prepare a rectangular digital signal source or passive element having a higher speed and a wider band in order to generate a narrow pulse signal.

As described above, according to the signal transmission system of the second embodiment, since the characteristic impedance of each of the short stub and the open stub is made to have the same value as the resistance value between the connection point connecting the short stub and the open stub and the signal source, and as the characteristic impedance of the lossy transmission path, in addition to the effect of the first embodiment, a high-speed and wide-band rectangular digital signal source or passive element is unnecessary, and thus it is possible to achieve low cost.

Third Embodiment

In the third embodiment, the short stub 141 and the open stub 142 of the pulse generation circuit are configured by a micro strip line (MSL) or a strip line (SL) in the substrate.

Figure 5:
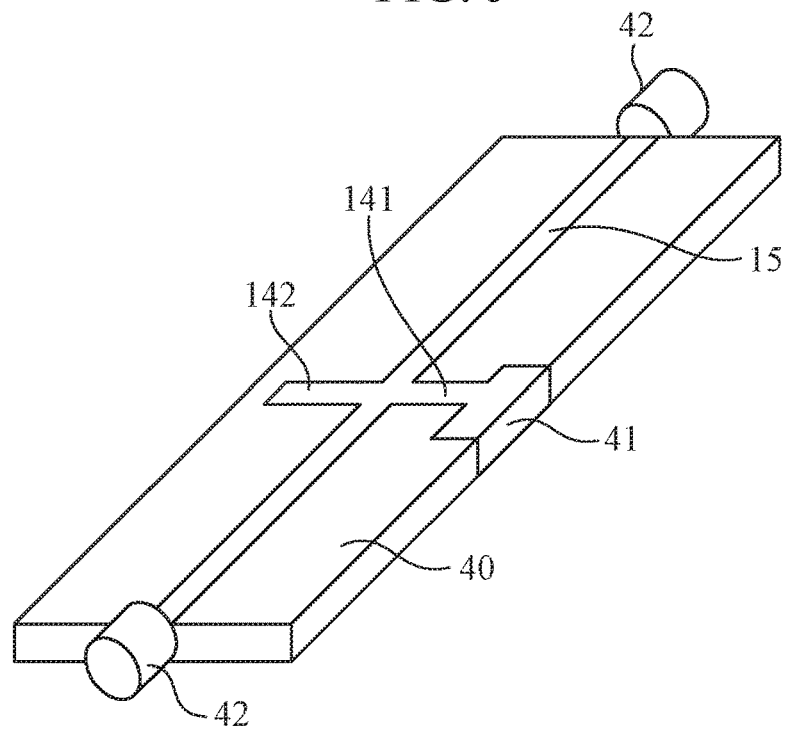
FIG. 5 is a perspective view showing a pulse generation circuit in a signal transmission system according to a third embodiment of this invention.

FIG. 5 is a perspective view showing a pulse generation circuit in a signal transmission system of the third embodiment. In the illustrated pulse generation circuit, a main line 15, a short stub 141, an open stub 142, and a ground region 41 are provided on the surface of the substrate 40. Further, the main line 15 is provided with, for example, a coaxial connector 42 at each of both ends of the substrate 40, thereby connecting the output resistor 13 and the lossy transmission path 20. In the third embodiment, the short stub 141 and the open stub 142 are provided in the pulse generation circuit as in the first embodiment, and the short stub 141 and the open stub 142 can be implemented by printed board wiring, such as the micro strip line (MSL) or the strip line (SL), and therefore, an expensive delay element or delay circuit is unnecessary, so that low cost can be achieved.

Note that the short stub 141 and the open stub 142 included in the pulse generation circuit of the third embodiment can also be implemented using a coaxial cable. For example, assuming that the propagation delay time of the coaxial cable is 5 ns/m and the transition time of the rectangular wave signal is 20 ns, the coaxial cable length corresponding to the ¼ stub is 1 m=100 cm. Similarly, the coaxial cable length is 150 cm when the transition time of the rectangular wave signal is 30 ns, and the coaxial cable length is 250 cm when the transition time of the rectangular wave signal is 50 ns. Further, for example, a GND short-circuit terminal may be connected to the end of the coaxial cable corresponding to the short stub 141. The end of the coaxial cable corresponding to the open stub 142 is left open if nothing is connected.

In addition, although the above example applied to the pulse generation circuit 14 of the first embodiment has been described, it may be applied to the pulse generation circuit 14a of the second embodiment.

As described above, according to the signal transmission system of the third embodiment, in the pulse generation circuit, at least one of the short stub and the open stub is configured by one of the wiring in the substrate, the micro strip line, and the strip line, and therefore, an expensive delay element or delay circuit is unnecessary, so that low cost can be achieved.

Fourth Embodiment

In the fourth embodiment, a short stub and an open stub of a pulse generation circuit are configured by vias (through holes) in a substrate.

Figure 6:
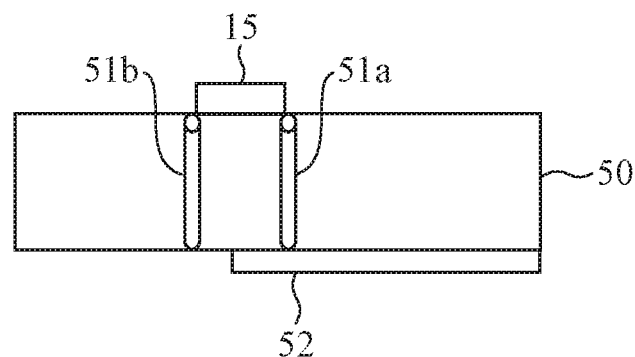
FIG. 6 is a cross-sectional view showing a pulse generation circuit in a signal transmission system according to a fourth embodiment of this invention.

FIG. 6 is a cross-sectional view showing a pulse generation circuit in a signal transmission system of the fourth embodiment.

In the fourth embodiment, a short stub 51a and an open stub 51b are configured using vias (through holes) in a substrate 50. The short stub 51a is implemented by a via connecting a signal line constituting the main line 15 and a ground region 52, and the open stub 51b is implemented by a via connected to the signal line constituting the main line 15 and not connected to the ground region 52. If the stub length is shorter than the thickness of the substrate 50, the stub can be implemented by performing a back drill process or the like.

As described above, according to the signal transmission system of the fourth embodiment, since at least one of the short stub and the open stub in the pulse generation circuit is configured by a via in the substrate, the mounting area for a stub wiring can be reduced.

Fifth Embodiment

In the fifth embodiment, a transition time adjusting buffer for adjusting the transition time of a rectangular wave signal is provided.

Figure 7:
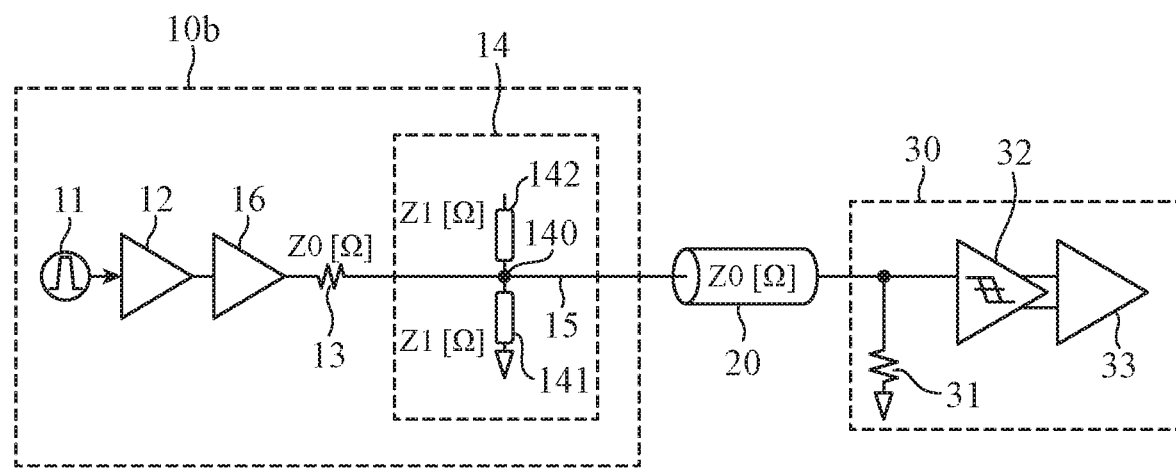
FIG. 7 is a configuration diagram showing a signal transmission system according to a fifth embodiment of this invention.

FIG. 7 is a configuration diagram of a signal transmission system according to the fifth embodiment.

In the signal transmission system according to the fifth embodiment, a transmission unit 10b includes a transition time adjusting buffer 16. The transition time adjusting buffer 16 is connected between the buffer circuit 12 and the output resistor 13, and has a function of changing the transition time, that is, the rise time and the fall time of the rectangular wave signal. Since the other configuration is the same as that of the first embodiment shown in FIG. 1, the corresponding parts are denoted with the same reference numerals, and the description thereof is omitted.

In the fifth embodiment, for example, when the rise/fall time of the rectangular wave signal transmitted from the digital signal source 11 is shorter than the length of the short stub 141 or the open stub 142 (it is very fast rising/falling), by the transition time adjusting buffer 16, the rise/fall time is adjusted so as to increase t. Alternatively, the transition time adjusting buffer 16 suited for the length of the short stub 141 and the open stub 142 is selected. Other operations are the same as those in the first embodiment.

The above example applied to the signal transmission system according to the first embodiment has been described, but it may be applied to the signal transmission system according to the second embodiment.

As described above, according to the signal transmission system of the fifth embodiment, in the transmission unit, the transition time adjusting buffer that changes the transition time of the rectangular wave signal is provided between the signal source and the pulse generation circuit. Therefore, for example, even when the transition time of the rectangular wave signal is very short, it is possible to avoid a decrease in the voltage of the pulse signal output from the pulse generation circuit. Alternatively, it is possible to adjust the pulse width and amplitude by selecting a transition time adjusting buffer suited for the length of the short stub and the open stub.

It should be noted that the invention of the present application can freely combine the embodiments, modify any constituent element of each embodiment, or omit any constituent element in each embodiment within the scope of the invention.

INDUSTRIAL APPLICABILITY

As described above, the signal transmission system according to this invention relates to a configuration in which a rectangular wave signal is converted into a pulse signal and transmitted to a lossy transmission path, and the pulse signal is converted into a rectangular wave signal at a receiving unit, and is suitable for improving communication characteristics in signal transmission using lossy transmission paths such as cables and printed board wiring.

REFERENCE SIGNS LIST 10, 10a, 10b: transmission unit, 11: digital signal source, 12: buffer circuit, 13: output resistance, 14, 14a: pulse generation circuit, 15: main line, 16: transition time adjusting buffer, 20: lossy transmission path, 30: receiving unit, 31: terminating resistor, 32: comparison circuit, 33: amplifier, 40, 50: substrate, 41, 52: ground region, 42: coaxial connector, 140: connection point, 51a, 141, 141a: short stub, 51b, 142, 142a: open stub

The invention claimed is:

1. A signal transmission system comprising: a transmitter to transmit a signal; and a receiver to receive the signal from the transmitter via a lossy transmission path, wherein
the transmitter includes
a signal source to generate a rectangular wave signal, and
a pulse generation circuit including a short stub and an open stub each of whose propagation time corresponds to ¼ of a transition time of the rectangular wave signal, and to generate a pulse signal corresponding to the rectangular wave signal, and output the pulse signal to the lossy transmission path, and
the receiver includes
a comparator having a hysteresis function, and to convert the pulse signal received via the lossy transmission path into the rectangular wave signal.

2. The signal transmission system according to claim 1, wherein characteristic impedance of each of the short stub and the open stub has the same value as a resistance value between a connection point connecting the short stub and the open stub and the signal source and as characteristic impedance of the lossy transmission path.

3. The signal transmission system according to claim 1, wherein in the pulse generation circuit, at least one of the short stub and the open stub is configured by one of wiring in a substrate, a microstrip line, and a strip line.

4. The signal transmission system according to claim 1, wherein in the pulse generation circuit, at least one of the short stub and the open stub is configured by a via in a substrate.

5. The signal transmission system according to claim 1, wherein in the transmitter, a transition time adjusting buffer to change the transition time of the rectangular wave signal is provided between the signal source and the pulse generation circuit.

* * * * *